(12) United States Patent
Chang et al.

(10) Patent No.: US 11,676,625 B2
(45) Date of Patent: *Jun. 13, 2023

(54) UNIFIED ENDPOINTER USING MULTITASK AND MULTIDOMAIN LEARNING

(71) Applicant: Google LLC, Mountain View, CA (US)

(72) Inventors: Shuo-Yiin Chang, Sunnyvale, CA (US); Bo Li, Fremont, CA (US); Gabor Simko, Santa Clara, CA (US); Maria Carolina Parada San Martin, Boulder, CO (US); Sean Matthew Shannon, Mountain View, CA (US)

(73) Assignee: Google LLC, Mountain View, CA (US)

( * ) Notice: Subject to any disclaimer, the term of this patent is extended or adjusted under 35 U.S.C. 154(b) by 220 days.

This patent is subject to a terminal disclaimer.

(21) Appl. No.: 17/152,918

(22) Filed: Jan. 20, 2021

(65) Prior Publication Data
US 2021/0142174 A1 May 13, 2021

Related U.S. Application Data

(63) Continuation of application No. 16/711,172, filed on Dec. 11, 2019, now Pat. No. 10,929,754, which is a
(Continued)

(51) Int. Cl.
*G10L 15/16* (2006.01)
*G10L 25/78* (2013.01)
(Continued)

(52) U.S. Cl.
CPC ........... *G10L 25/78* (2013.01); *G06F 18/214* (2023.01); *G06N 3/045* (2023.01); *G06N 3/08* (2013.01);
(Continued)

(58) Field of Classification Search
CPC .......... G06N 3/08; G06N 3/0454; G06N 3/04; G06N 5/046; G06N 5/04; G06N 20/20;
(Continued)

(56) References Cited

U.S. PATENT DOCUMENTS 4,713,777 A 12/1987 Klovstad et al.
4,980,918 A 12/1990 Bahl et al.
(Continued)

FOREIGN PATENT DOCUMENTS

JP H01219893 A 9/1989
JP H08115093 A 5/1996
(Continued)

OTHER PUBLICATIONS

Arsikere et al. "Computationally-efficient endpointing features for natural spoken interaction with personal-assistant systems," IEEE international Conference on Acoustics, Speech and Signal Processing, May 4, 2014, 5 pages.
(Continued)

*Primary Examiner* — Huyen X Vo
(74) *Attorney, Agent, or Firm* — Honigman LLP; Brett A. Krueger; Grant Griffith

(57) ABSTRACT

A method for training an endpointer model includes short-form speech utterances and long-form speech utterances. The method also includes providing a short-form speech utterance as input to a shared neural network, the shared neural network configured to learn shared hidden representations suitable for both voice activity detection (VAD) and end-of-query (EOQ) detection. The method also includes generating, using a VAD classifier, a sequence of predicted VAD labels and determining a VAD loss by comparing the sequence of predicted VAD labels to a corresponding sequence of reference VAD labels. The method also includes, generating, using an EOQ classifier, a sequence of
(Continued)

predicted EOQ labels and determining an EOQ loss by comparing the sequence of predicted EOQ labels to a corresponding sequence of reference EOQ labels. The method also includes training, using a cross-entropy criterion, the endpointer model based on the VAD loss and the EOQ loss.

22 Claims, 6 Drawing Sheets

Related U.S. Application Data continuation-in-part of application No. 16/001,140, filed on Jun. 6, 2018, now Pat. No. 10,593,352.

(60) Provisional application No. 62/515,771, filed on Jun. 6, 2017.

(51) Int. Cl.
    *G06N 3/08* (2023.01)
    *G06N 20/20* (2019.01)
    *G06N 5/046* (2023.01)
    *G06F 18/214* (2023.01)
    *G06N 3/045* (2023.01)

(52) U.S. Cl.
    CPC ............ *G06N 5/046* (2013.01); *G06N 20/20* (2019.01); *G10L 15/16* (2013.01)

(58) Field of Classification Search
    CPC ...... G06N 3/0445; G06K 9/6256; G06K 9/62; G10L 15/16; G10L 25/30; G10L 25/78; H04M 9/10
    See application file for complete search history.

(56) References Cited

U.S. PATENT DOCUMENTS

| | | | |
|---|---|---|---|
| 5,479,563 A | 12/1995 | Yamaguchi | |
| 5,940,794 A | 8/1999 | Abe | |
| 6,018,708 A | 1/2000 | Dahan et al. | |
| 6,029,130 A | 2/2000 | Ariyoshi | |
| 6,321,197 B1 | 11/2001 | Kushner et al. | |
| 6,324,509 B1 | 11/2001 | Bi et al. | |
| 6,453,292 B2 | 9/2002 | Ramaswamy et al. | |
| 6,771,887 B1 | 8/2004 | Okawa et al. | |
| 6,810,375 B1 | 10/2004 | Ejerhed | |
| 7,035,807 B1 | 4/2006 | Brittain et al. | |
| 7,136,806 B2 | 11/2006 | Miyahira et al. | |
| 7,177,810 B2 | 2/2007 | Shriberg et al. | |
| 7,277,853 B1 | 10/2007 | Bou-Ghazale et al. | |
| 7,610,199 B2 | 10/2009 | Abrash et al. | |
| 7,665,024 B1 | 2/2010 | Kondziela | |
| 7,991,614 B2 | 8/2011 | Washio et al. | |
| 8,000,966 B2 | 8/2011 | Mori et al. | |
| 8,099,280 B2 | 1/2012 | Kuboyama et al. | |
| 8,165,880 B2 | 4/2012 | Hetherington et al. | |
| 8,170,875 B2 | 5/2012 | Hetherington et al. | |
| 8,175,876 B2 | 5/2012 | Bou-Ghazale et al. | |
| 8,494,857 B2 | 7/2013 | Pakhomov | |
| 8,554,564 B2 | 10/2013 | Hetherington et al. | |
| 8,600,746 B1 | 12/2013 | Lei et al. | |
| 8,719,015 B2 | 5/2014 | Jang et al. | |
| 8,762,150 B2 | 6/2014 | Edgington et al. | |
| 8,775,191 B1 | 7/2014 | Sharifi et al. | |
| 8,843,369 B1 | 9/2014 | Sharifi | |
| 9,009,054 B2 | 4/2015 | Liu et al. | |
| 9,311,932 B2 | 4/2016 | Carter | |
| 9,355,191 B1* | 5/2016 | Finkelstein ....... G06F 16/90324 | |
| 9,437,186 B1 | 9/2016 | Liu et al. | |
| 2001/0034601 A1 | 10/2001 | Chujo et al. | |
| 2001/0056344 A1 | 12/2001 | Ramaswamy et al. | |
| 2005/0038652 A1 | 2/2005 | Dobler | |
| 2005/0108011 A1 | 5/2005 | Keough et al. | |
| 2005/0171768 A1 | 8/2005 | Gierach | |
| 2006/0149558 A1 | 7/2006 | Kahn et al. | |
| 2006/0200350 A1 | 9/2006 | Attwater et al. | |
| 2006/0235688 A1 | 10/2006 | Bicego et al. | |
| 2006/0287859 A1 | 12/2006 | Hetherington et al. | |
| 2007/0016426 A1 | 1/2007 | Hershey et al. | |
| 2007/0100626 A1 | 5/2007 | Miller et al. | |
| 2007/0143110 A1 | 6/2007 | Acero et al. | |
| 2007/0168890 A1 | 7/2007 | Zhao et al. | |
| 2007/0201639 A1 | 8/2007 | Park et al. | |
| 2007/0225982 A1 | 9/2007 | Washio | |
| 2008/0235019 A1 | 9/2008 | Witzman | |
| 2008/0294433 A1 | 11/2008 | Yeung et al. | |
| 2009/0063150 A1 | 3/2009 | Nasukawa et al. | |
| 2009/0076817 A1 | 3/2009 | Jeon et al. | |
| 2009/0149166 A1 | 6/2009 | Habib et al. | |
| 2010/0017209 A1 | 1/2010 | Yu et al. | |
| 2010/0076761 A1 | 3/2010 | Juergen et al. | |
| 2010/0131279 A1 | 5/2010 | Pilz | |
| 2010/0174533 A1 | 7/2010 | Pakhomov | |
| 2010/0280827 A1 | 11/2010 | Mukerjee et al. | |
| 2010/0292989 A1 | 11/2010 | Kitade et al. | |
| 2011/0105859 A1 | 5/2011 | Popovic et al. | |
| 2011/0106531 A1 | 5/2011 | Liu et al. | |
| 2011/0153309 A1 | 6/2011 | Kim et al. | |
| 2011/0264447 A1 | 10/2011 | Visser et al. | |
| 2012/0089392 A1 | 4/2012 | Larco et al. | |
| 2012/0265528 A1 | 10/2012 | Gruber et al. | |
| 2013/0124646 A1 | 5/2013 | Kraft et al. | |
| 2014/0012573 A1 | 1/2014 | Hung et al. | |
| 2014/0156268 A1 | 6/2014 | Arizmendi et al. | |
| 2014/0337370 A1 | 11/2014 | Aravamudan et al. | |
| 2015/0106088 A1 | 4/2015 | Jarvinen | |
| 2015/0199966 A1 | 7/2015 | Paulik et al. | |
| 2015/0206544 A1 | 7/2015 | Carter | |
| 2015/0310879 A1 | 10/2015 | Buchanan et al. | |
| 2015/0312246 A1 | 10/2015 | Mattsson et al. | |
| 2015/0348538 A1 | 12/2015 | Donaldson | |
| 2015/0371665 A1 | 12/2015 | Naik et al. | |
| 2016/0063992 A1 | 3/2016 | Selfridge | |
| 2016/0093313 A1* | 3/2016 | Vickers ................ G10L 25/78 704/232 |
| 2016/0351196 A1 | 12/2016 | Fanty | |
| 2016/0379632 A1 | 12/2016 | Hoffmeister et al. | |
| 2017/0092297 A1* | 3/2017 | Sainath ................ G10L 25/78 |
| 2017/0354363 A1 | 12/2017 | Quatieri et al. | |
| 2018/0130460 A1* | 5/2018 | Nagano ............... G06F 16/3329 |
| 2020/0327168 A1* | 10/2020 | Jiang ...................... G06N 3/049 |

FOREIGN PATENT DOCUMENTS

| | | |
|---|---|---|
| JP | H10254475 A | 9/1998 |
| JP | 2001219893 A | 8/2001 |
| JP | 200517932 A | 1/2005 |
| JP | 2008508564 A | 3/2008 |
| JP | 2008115093 A | 5/2008 |
| JP | 4433704 B2 | 3/2010 |
| JP | 2010254475 A | 11/2010 |
| JP | 2014134675 A | 7/2014 |
| WO | 2001086633 A1 | 11/2001 |
| WO | 2011151502 A1 | 12/2011 |
| WO | 2013053798 A1 | 4/2013 |
| WO | 2015073071 A1 | 5/2015 |

OTHER PUBLICATIONS

PCT International Search Report and Written Opinion issued in International Application No. PCT/US2018/036188, dated Aug. 20, 2018, 17 pages.

Shannon et al. "Improved End-of-Query Detection for Streaming Speech Recognition," Interspeech, Aug. 2017, 5 pages.

'developer.amazon.com' [online] "Alexa Scientists Address Challenges of End-Pointing," Roland Maas, Apr. 10, 2018 [retrieved on May 30, 2018] Retrieved from Internet: URL<https://developer.amazon.com/blogs/alexa/post/bbl909e9-aa65-4051-9316-eba9dd3bf459/alexa-scientists-address-challenges-of-end-pointing> 7 pages.

(56) References Cited

OTHER PUBLICATIONS

Ferrer et al., "A Prosody-Based Approach to End-of-Utterance Detection that does not require Speech Recognition," IEEE International Conference on Acoustics, Speech, and Signal Processing, 2003, 1:1-608-1-611.

Ferrer et al., "Is the Speaker done yet? Faster and more accurate End-of-Utterance detection using Prosody," Interspeech, ISCA, (2002), 2061-2064.

Gotoh et al., "Sentence Boundary Detection in Broadcast Speech Transcripts," in Proc. of ISCA Workshop: Automatic Speech Recognition: Challenges for the new Millennium ASR-2000, Sep. 2000, 8 pages.

Gravano et al. "Turn-taking cues in task-oriented dialogue," Computer and Language, Elseview, London, GB, 25(3), Jul. 2011, 34 pages.

Liu et al. "Accurate Endpointing with Expected Pause Duration," Sixteenth Annual Conference of the International Speech Communication Association, Sep. 2015, 5 pages.

Liu et al., "Comparing and Combining Generative and Posterior Probability Models: Some Advances in Sentence Boundary Detection in Speech," Proc. EMNLP, 2004, Jan. 2004, 8 pages.

Maas et al. "Anchored Speech Detection," Interspeech, Sep. 2016, 5 pages.

Maas et al. "Combining Acoustic Embeddings and Decoding Features for End-of-Utterance Detection in Real-Time Far-Field Speech Recognition Systems," Amazon, Mar. 16, 2018, [retrieved on May 30, 2018] Retrieved from Internet: URL< https://rn.medla- amazon.com/images/G/01/amazon.jobs/Endpointing2p0_V20180316._CB1521742036_.pdf> 5 pages.

Maas et al. "Domain-Specific Utterance End-Point Detection for Speech Recognition," Proceedings ofInterspeech, Aug. 2017, 5 pages.

Raux et al. "Optimizing endpointing thresholds using dialogue features in a spoken dialogue system," Proceedings of the 9th SIGDIAL Workshop on Discourse and Dialogue, Jan. 1, 2008, 10 pages.

Yoshida. "Automatic utterance segmentation in spontaneous speech, Master thesis," Massachusetts institute of technology, Sep. 22, 2002, 80 pages.

\* cited by examiner

UNIFIED ENDPOINTER USING MULTITASK AND MULTIDOMAIN LEARNING

CROSS REFERENCE TO RELATED APPLICATIONS

This U.S. patent application is a Continuation of, and claims priority under 35 U.S.C. § 120 from, U.S. patent application Ser. No. 16/711,172, filed on Dec. 11, 2019, which is a Continuation-In-Part of, and claims priority under 35 U.S.C. § 120 from, U.S. patent application Ser. No. 16/001,140, filed on Jun. 6, 2018, which claims priority under 35 U.S.C. § 119(e) to U.S. Provisional Application 62/515,771, filed on Jun. 6, 2017. The disclosures of these prior applications are considered part of the disclosure of this application and are hereby incorporated by reference in their entireties.

TECHNICAL FIELD

This disclosure relates to a unified endpointer that uses multitask and multidomain learning.

BACKGROUND

Natural language processing relates to the interactions between computers and human natural languages. In particular, natural language processing focusses of how to program computers to process varying amounts of natural language data. Natural language processing may involve speech recognition, natural language understanding, and natural language generation.

SUMMARY

One aspect of the disclosure provides a method of training a multidomain endpointer model. The method includes obtaining, by data processing hardware, training data that includes a first training set of short-form speech utterances and a second training set of long-form speech utterances. For each short-form speech utterance in the first training set of short-form speech utterances, the method includes providing, by the data processing hardware, the corresponding short-form speech utterance as input to a shared neural network of the multidomain neural network and generating, by the data processing hardware, using a voice activity detection (VAD) classifier output layer of the multidomain endpointer model, a short-form speech sequence of predicted VAD labels each including one of a predicted VAD speech label or a predicted VAD silence label. The shared neural network is configured to learn shared hidden representations suitable for both VAD and end-of-query (EOQ) detection. For each short-form speech utterance in the first training set of short-form speech utterances, the method also includes: determining, by the data processing hardware, a short-form speech VAD loss associated with the corresponding short-form speech utterance by comparing the short-form speech sequence of predicted VAD labels to a corresponding short-form speech sequence of reference VAD labels for the corresponding short-form speech utterance using forced alignment; generating, by the data processing hardware, using an EOQ classifier output layer of the multidomain endpointer model, a sequence of predicted EOQ labels each including one of a predicted EOQ speech label, a predicted EOQ initial silence label, a predicted EOQ intermediate silence label, or a predicted EOQ final silence label; determining, by the data processing hardware, an EOQ loss associated with the corresponding short-form speech utterance by comparing the short-form speech sequence of predicted EOQ labels to a corresponding short-form speech sequence of reference EOQ labels for the corresponding short-form speech utterance using forced alignment; and training, by the data processing hardware, using cross-entropy criterion, the multidomain endpointer model based on the short-form speech VAD loss and the EOQ loss.

Implementations of the disclosure may include one or more of the following optional features. In some implementations, the method also includes, for each long-form speech utterance in the second training set of long-form speech utterances: providing, by the data processing hardware, the corresponding long-form speech utterance as input to the shared neural network of the multidomain neural network; generating, by the data processing hardware, using the VAD classifier output layer of the multidomain endpointer model, a long-form speech sequence of predicted VAD labels each including one of the predicted VAD speech label or the predicted VAD silence label; determining, by the data processing hardware, a long-form speech VAD loss by comparing the long-form speech sequence of predicted VAD labels to a corresponding long-form speech sequence of reference VAD labels for the corresponding long-form speech utterance using force alignment; and training, by the data processing hardware, using the cross-entropy criterion, the multidomain endpointer model using the long-form speech VAD loss. Providing the corresponding long-form speech utterance as input to the shared neural network may include providing long-form domain information as an additional input to the shared neural network, the long-form speech domain information indicating that the corresponding long-form speech utterance is associated with a long-form speech domain. Similarly, providing the corresponding short-form speech utterance as input to the shared neural network may include providing short-form domain information as an additional input to the shared neural network, the short-form domain information indicating that the corresponding short-form speech utterance is associated with a short-form speech domain.

In some examples, each short-form speech utterance in the first training set of short-form speech utterances includes a corresponding sequence of short-form acoustic features representing the short-form speech utterance, each long-form speech utterance in the second training set of long-form speech utterances includes a corresponding sequence of long-form acoustic features representing the long-form speech utterance, and providing the corresponding short-form speech utterance and the short-form domain information as inputs to the shared neural network includes: for each short-form acoustic feature of the sequence of short-form acoustic features, generating, using a domain encoder layer, a corresponding domain-aware hidden speech representation by converting a concatenation between the short-form acoustic feature and a short-form domain index, the short-form domain index representing the short-form domain information; and providing, as input to the shared neural network, the corresponding domain-aware hidden speech representations generated for the sequence of short-form acoustic features. In these examples, providing the corresponding long-form speech utterance and the long-form domain information as inputs to the shared neural network includes: for each long-form acoustic feature of the sequence of long-form acoustic features, generating, using the domain encoder layer, a corresponding domain-aware hidden speech representation by converting a concatenation between the long-form acoustic feature and a long-form domain index, the long-form domain index representing the long-form domain information; and providing, as input to the shared neural network, the corresponding domain-aware hidden speech representations generated for the sequence of long-form acoustic features. The short-form and long-form domain indexes may include categorical integers.

In some implementations, the method also includes thresholding, by the data processing hardware, framewise posteriors of the predicted EOQ final silence labels generated for each of the short-form speech utterances to obtain a hard microphone closing decision. In additional implementations, the method also includes, for each short-form speech utterance in the first training set of short-form speech utterances, predicting, by the data processing hardware, using the VAD classifier output layer, an EOQ decision upon detecting a duration of silence in the corresponding short-form speech utterance that satisfies a time threshold.

The shared neural network may include a unified convolutional, long short-term memory, deep neural network (CLDNN) having a unidirectional architecture. Here, the CLDNN may include: a convolutional input layer; a first feedforward deep neural network (DNN) layer configured to receive, as input during each of a plurality of time steps, an output of the convolutional input layer; one or more long short-term memory LSTM) layers; and a second feedforward DNN layer. Additionally, the VAD classifier output layer may include a first softmax output layer configured to receive, as input during each of a plurality of time steps, an output of the second feedforward DNN layer of the CLDNN, while the EOQ classifier output layer may include a second softmax output layer configured to receive, as input during each of the plurality of time steps, the output of the second feedforward DNN layer of the CLDNN.

In some examples, the first training set of short-form speech utterances each include a duration that is shorter than a duration of each of the long-form speech utterances of the second training set of long-form speech utterances. Additionally, each short-form speech utterance in the first training set of short-form speech utterances may be associated with one of a voice query or a voice command. In some scenarios, each long-form speech utterance in the second training set of long-form speech utterances includes a duration of at least ten seconds.

Another aspect of the disclosure provides a system for training a multidomain endpointer model. The system includes data processing hardware and memory hardware in communication with the data processing hardware and storing instructions that when executed on the data processing hardware cause the data processing hardware to perform operations that include obtaining training data that includes a first training set of short-form speech utterances and a second training set of long-form speech utterances. For each short-form speech utterance in the first training set of short-form speech utterances, the operations also include providing the corresponding short-form speech utterance as input to a shared neural network of the multidomain neural network and generating, using a voice activity detection (VAD) classifier output layer of the multidomain endpointer model, a short-form speech sequence of predicted VAD labels each including one of a predicted VAD speech label or a predicted VAD silence label. The shared neural network is configured to learn shared hidden representations suitable for both VAD and end-of-query (EOQ) detection. For each short-form speech utterance in the first training set of short-form speech utterances, the operations also include: determining a short-form speech VAD loss associated with the corresponding short-form speech utterance by comparing the short-form speech sequence of predicted VAD labels to a corresponding short-form speech sequence of reference VAD labels for the corresponding short-form speech utterance using forced alignment; generating, using an EOQ classifier output layer of the multidomain endpointer model, a sequence of predicted EOQ labels each including one of a predicted EOQ speech label, a predicted EOQ initial silence label, a predicted EOQ intermediate silence label, or a predicted EOQ final silence label; determining an EOQ loss associated with the corresponding short-form speech utterance by comparing the short-form speech sequence of predicted EOQ labels to a corresponding short-form speech sequence of reference EOQ labels for the corresponding short-form speech utterance using forced alignment; and training, using cross-entropy criterion, the multidomain endpointer model based on the short-form speech VAD loss and the EOQ loss.

This aspect may include one or more of the following optional features. In some implementations, the operations also includes, for each long-form speech utterance in the second training set of long-form speech utterances: providing the corresponding long-form speech utterance as input to the shared neural network of the multidomain neural network; generating, using the VAD classifier output layer of the multidomain endpointer model, a long-form speech sequence of predicted VAD labels each including one of the predicted VAD speech label or the predicted VAD silence label; determining a long-form speech VAD loss by comparing the long-form speech sequence of predicted VAD labels to a corresponding long-form speech sequence of reference VAD labels for the corresponding long-form speech utterance using force alignment; and training, using the cross-entropy criterion, the multidomain endpointer model using the long-form speech VAD loss. Providing the corresponding long-form speech utterance as input to the shared neural network may include providing long-form domain information as an additional input to the shared neural network, the long-form speech domain information indicating that the corresponding long-form speech utterance is associated with a long-form speech domain. Similarly, providing the corresponding short-form speech utterance as input to the shared neural network may include providing short-form domain information as an additional input to the shared neural network, the short-form domain information indicating that the corresponding short-form speech utterance is associated with a short-form speech domain.

In some examples, each short-form speech utterance in the first training set of short-form speech utterances includes a corresponding sequence of short-form acoustic features representing the short-form speech utterance, each long-form speech utterance in the second training set of long-form speech utterances includes a corresponding sequence of long-form acoustic features representing the long-form speech utterance, and providing the corresponding short-form speech utterance and the short-form domain information as inputs to the shared neural network includes: for each short-form acoustic feature of the sequence of short-form acoustic features, generating, using a domain encoder layer, a corresponding domain-aware hidden speech representation by converting a concatenation between the short-form acoustic feature and a short-form domain index, the short-form domain index representing the short-form domain information; and providing, as input to the shared neural network, the corresponding domain-aware hidden speech representations generated for the sequence of short-form acoustic features. In these examples, providing the corresponding long-form speech utterance and the long-form domain information as inputs to the shared neural network includes: for each long-form acoustic feature of the sequence of long-form acoustic features, generating, using the domain encoder layer, a corresponding domain-aware hidden speech representation by converting a concatenation between the long-form acoustic feature and a long-form domain index, the long-form domain index representing the long-form domain information; and providing, as input to the shared neural network, the corresponding domain-aware hidden speech representations generated for the sequence of long-form acoustic features. The short-form and long-form domain indexes may include categorical integers.

In some implementations, the operations also include thresholding framewise posteriors of the predicted EOQ final silence labels generated for each of the short-form speech utterances to obtain a hard microphone closing decision. In additional implementations, the operations also include, for each short-form speech utterance in the first training set of short-form speech utterances, predicting, using the VAD classifier output layer, an EOQ decision upon detecting a duration of silence in the corresponding short-form speech utterance that satisfies a time threshold.

The shared neural network may include a unified convolutional, long short-term memory, deep neural network (CLDNN) having a unidirectional architecture. Here, the CLDNN may include: a convolutional input layer; a first feedforward deep neural network (DNN) layer configured to receive, as input during each of a plurality of time steps, an output of the convolutional input layer; one or more long short-term memory LSTM) layers; and a second feedforward DNN layer. Additionally, the VAD classifier output layer may include a first softmax output layer configured to receive, as input during each of a plurality of time steps, an output of the second feedforward DNN layer of the CLDNN, while the EOQ classifier output layer may include a second softmax output layer configured to receive, as input during each of the plurality of time steps, the output of the second feedforward DNN layer of the CLDNN.

In some examples, the first training set of short-form speech utterances each include a duration that is shorter than a duration of each of the long-form speech utterances of the second training set of long-form speech utterances. Additionally, each short-form speech utterance in the first training set of short-form speech utterances may be associated with one of a voice query or a voice command. In some scenarios, each long-form speech utterance in the second training set of long-form speech utterances includes a duration of at least ten seconds.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
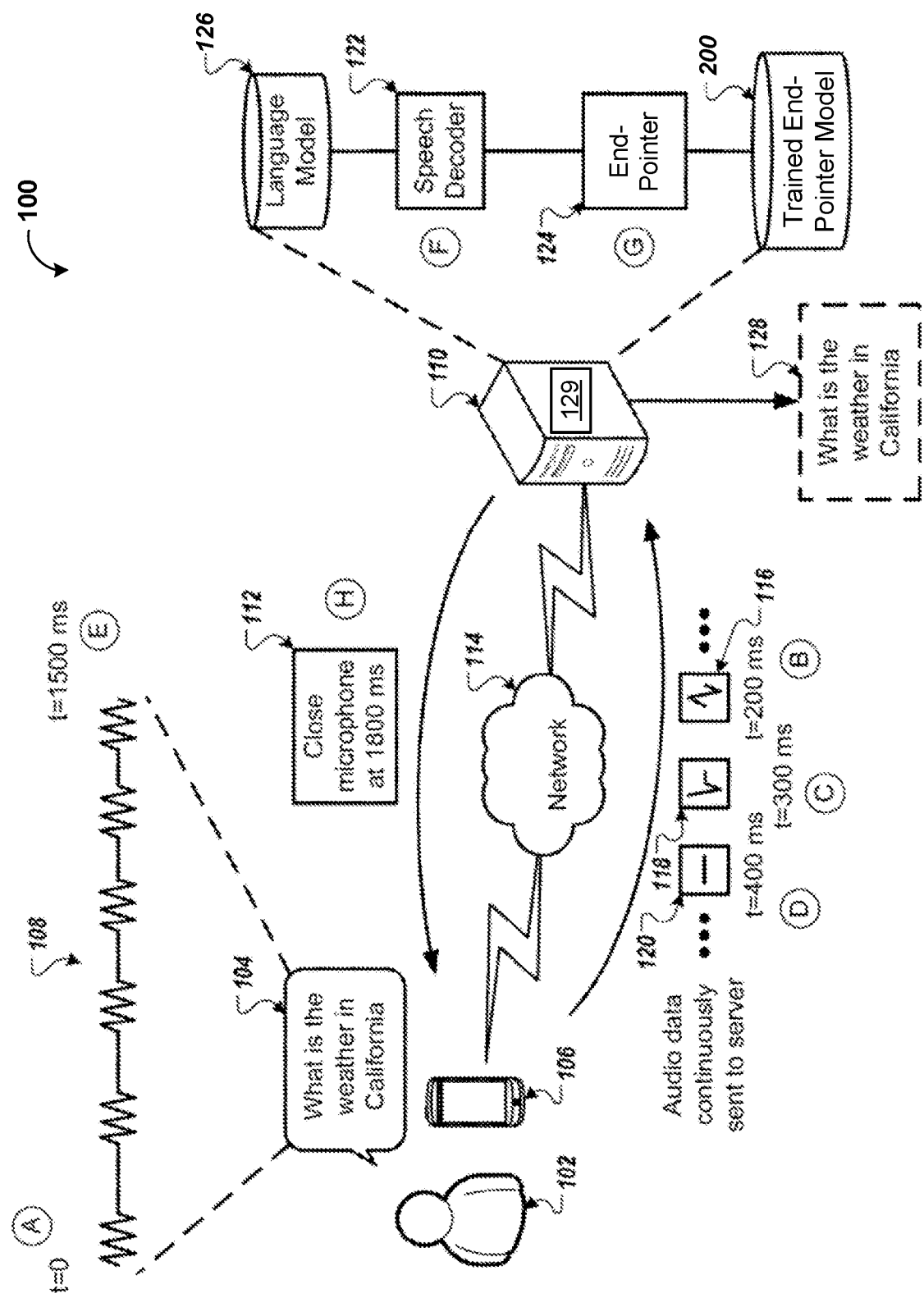
FIG. 1 is a schematic view of an example system for endpointing an utterance.

Natural language processing systems typically use endpointers to determine when a user has started and finished speaking. Once demarcated, the portion of the audio representing the user's speech is transmitted to another component of the system for further processing, or other components can be activated or powered on for additional processing. Some traditional endpointers evaluate the duration of pauses between words in determining when an utterance begins or ends. For instance, if a user says "what is <long pause> for dinner," a traditional endpointer may segment the voice input at the long pause, and may instruct the natural language processing system to attempt to process the incomplete phrase "what is," instead of the complete phrase "what is for dinner." If an endpointer designates an incorrect beginning or ending point for a voice input, the result of processing the voice input using the natural language processing system may be inaccurate or undesirable. An inaccurately endpointed utterance may cause the system to unnecessarily activate another component of the system to further process the audio data. This unnecessary activation may waste computing resources and/or battery power because the user may end up repeating the same utterance in hopes of the system properly demarcating the user's speech and activating the proper components or performing the proper additional processing.

Some natural language processing systems may include a speech decoder. The speech decoder may be configured to process, using a language model, audio data that corresponds to a user's utterance to generate a transcription of the audio data and determine when the user is likely finished speaking. A remote server may implement the speech decoder which may require a user device that receives the utterance to transmit, over a network, portions of the audio data as the user speaks the utterance and the receiving device detects the utterance using a microphone. However, in other configurations, the user device that receives and detects the utterance using the microphone may also implement the speech decoder, thereby enabling the user device to process the audio data corresponding to the received utterance and generate the transcription on device without requiring remote server.

In some implementations, the efficiency of the speech decoder, whether implemented on device or by a remote server, degrades in instances when the speech decoder receives audio data for processing in larger packets, thereby inhibiting the speech decoder from determining in a timely fashion whether the user has likely finished speaking or not. In doing so, the microphone of the user device detecting the utterance may remain open and detect sounds not intended for the user device. At the same time, delaying the closing of the microphone consequently delays execution of an action specified by the utterance. For example, if the utterance spoken by the user was a voice action to "Call Mom", there may be a delay in the user device initiating the call in scenarios when the speech decoder is slow to determine when the user likely stopped speaking. In this same example, the user device may also detect additional unintended audio which may result in performance of an action different than what the user intended, which may result in wastage of computational resources in interpreting and acting on the addition audio detected due to the speech decoder's inability to determine in a timely fashion when the user has likely finished speaking or not.

Speech recognition systems generally differentiate the role of endpointers between transcribing long-form speech (e.g., dictation) and short-form speech voice queries/actions. As used herein, short-form speech/utterances (e.g., voice queries/commands) include speech/utterances lasting a few seconds at most. Transcribing long-form speech/utterances on the other hand, is fundamental to applications like continuous transcription of long-form utterances lasting from minutes to hours, such as, without limitation, meetings, presentations, podcasts, or lecturers. Generally, the role of the endpointer for long-form speech is responsible for speech detection (e.g., voice activity detection (VAD)), and thus useful for segmentation and pre-filtering in processing long-form speech. On the other hand, the role of the endpointer for voice queries is responsible for query endpoint detection for predicting when to stop listening to a speaker and then send the received audio for processing to perform actions, thereby serving as an essential component for interactive voice systems as well as determining system latency. For both transcribing long-form speech and voice query/command tasks, the endpointer needs to be robust in challenging environments and has to generalize well to different domains with different speaking styles and rhythms.

Since the tasks of transcribing long-form speech and voice action/search queries are conventionally associated two different respective operating modes for the endpointer, the training of separate endpoint models associated with each domain (e.g., long-form speech and short-form speech) is required. As a result, automatic speech recognition (ASR) systems for various speech-enabled applications generally categorize these speech-enabled applications into long-form voice transcription applications and voice query/action applications. Long-form speech tasks include, without limitation, automatic video captioning, meeting summarization, and voicemail transcription to name few, and include processing/transcribing utterances lasting at least 10 seconds. Here, the endpointer is used as a pre-processor for the ASR systems to detect speech and filter out non-speech, thereby functioning as a traditional VAD problem and using a frame-level classifier configured to consume acoustic features to make a speech versus non-speech decision for each audio frame (e.g., every 10 ms). In error, a VAD-based endpointer may mistakenly accept background noise as speech or falsely reject speech that lead to deletion errors in recognition outputs (e.g., transcriptions) by the ASR system. On the other hand, false accepting of non-speech as speech by the VAD-based endpointer drastically decreases upstream processing by the ASR to make the ASR system computationally expensive.

Voice query/action tasks are typically used in interactive voice systems/applications, such as personal voice assistants, voice search, and dialog systems to name a few. Here, the ASR system processes/transcribes short-form utterances lasting from about 500 milliseconds to no more than 10 seconds. The endpointer is the component to determine when the user is finished speaking, i.e., query endpoint detection, whereby it is desirable to reduce latency as much as possible so that the ASR system can process the utterance quickly and respond to the user without cutting off the user's speech. Simply configuring a VAD-based endpointer for query endpoint detection when a fixed interval of silence following detected speech is problematic because potential acoustic cues such as filler sounds, past speaking rate, speaking rhythm, or fundamental frequency which imply whether a given pause is temporary stop or the end of query are ignored. With the recent adoption of ASR systems in real word applications and the advancement of domain-invariant ASR models that accurately recognize both long-form speech and short-form speech relating to voice actions/search queries, building a single system that can operate in both endpointer modes, e.g., long-form speech detection and query endpoint detection, is desirable.

Implementations herein are directed toward training a single multidomain endpointer model across multiple domains, namely voice query and long-form speech, by using machine learning and neural networks to quickly determine whether a user has likely stopped speaking regardless of which domain the user is speaking. The multidomain endpointer model uses a probabilistic end-of-query (EOQ) classifier on targets of speech, initial silence, intermediate silence, and final silence to predict whether or not the user has finished speaking at a given instance in time. Framewise posteriors of the final silence target are thresholded to obtain hard microphone closing decisions configured to decide microphone closing events. The multidomain endpointer model may use various acoustic speech characteristics that include pitch, loudness, intonation, sharpness, articulation, roughness, instability, and speech rate to determine whether the user has likely finished speaking. The multidomain endpointer model may also take into account other acoustic cues which may occur during pauses in use speech to determine whether the user has likely finished speaking.

In some implementations, the endpointer model employs a unified Convolutional, Long Short-Term Memory, Deep Neural Network CLDNN that leverages multitask learning (MTL) for jointly completing tasks across both the query endpoint detection domain and the long-form speech detection domain. Here, the two domains/tasks share hidden layers across the CLDNN but use separate respective output layers to maintain differences between domain specific endpoint targets. That is, the MTL uses a first output layer (e.g., first softmax output layer) as a voice activity detection (VAD) classifier and a second output layer (e.g., second softmax output layer) as the EOQ classifier. Here, the VAD classifier provided by the first output layer is associated with a probabilistic VAD output layer configured to make a sequence of framewise binary speech vs. silence predictions, while the probabilistic EOQ classifier provided by the second output layer is configured to predict one of the four targets/classes of speech, initial silence, intermediate silence, and final silence. Having four targets/classes helps the EOQ classifier capture any acoustic cues that may help differentiate silence at different locations in the utterance, such as, without limitation, pre-query silence, mid-query pauses, and final silence. As aforementioned, the EOQ classifier uses the final silence target for making hard microphone closing decisions.

FIG. 1 illustrates an example system 100 for detecting an end of an utterance. Briefly, and as described in more detail below, the user 102 speaks the utterance 104. The microphone of the computing device 106 detects the utterance 104. As the user 102 is speaking, the computing device 106 transmits portions of the audio data 108 of the utterance 108 to the server 110. As the server 110 receives the portions of the audio data 108, the server 110 processes the portions of the audio data 108 and determines when the user 102 is likely finished speaking. The server 110 transmits an instruction 112 to the computing device 106 to deactivate the microphone of the computing device 106.

At stage A and at time zero, the user 102 begins speaking the utterance 104. For example, the user may begin the utterance 104 by speaking "what." The computing device 106 detects the utterance 104 through a microphone. The computing device 106 may be any type of computing device that is capable of detecting sound. For example, the computing device 106 may be a phone, tablet, smart watch, smart speaker, smart display, smart appliance, smart headset, laptop computer, desktop computer, or any other similar type of computing device.

The computing device 106 receives and processes the utterance 104 as the user 102 begins speaking. The computing device 106 samples the audio detected by the microphone and converts the analog signal to a digital signal using an analog to digital converter. The computing device 106 may store the digitized audio in a buffer for further processing by the computing device 106 or transmission of the digitized audio to the server 106. In the example shown, the computing device 106 and the server 110 communicate through a network 114. The network 114 may be associated with a fast network that allows the computing device 106 to transmit smaller portions of the audio data 108 at a greater frequency than if the computing device 106 and the server 110 were communicating through a slower network. The computing device 106 and the server 110 may communicate through a slower network in other examples, whereby the computing device 106 must transmit larger portions of the audio data 108 at a slower frequency to the server 110.

At stage B, the computing device 106 begins transmitting portions of the audio data 108 to the server 110. For example, at time equals two hundred milliseconds, the computing device 106 transmits the portion 116 of the audio data 108. The portion 116 may correspond to the first hundred milliseconds of the audio data 108 or an initial portion of "what." Because the network 114 is fast enough, the computing device 106 may continue to transmit additional portions of the audio data 108 as short intervals. For example, at stage C and at time equals three hundred milliseconds, the computing device 106 transmits portion 118 of the audio data 108. The portion 118 of the audio data 108 may correspond to the second hundred milliseconds of the audio data 108 or a remaining portion of "what." At stage D and at time equals four hundred milliseconds, the computing device 106 transmits portion 120 of the audio data 108 to the server 110. The portion 120 of the audio data 108 may correspond to the third hundred milliseconds of the audio data 108 or the period of silence between "what" and "is."

The server 110 receives the portions 116, 118, and 120 of the audio data 108 and processes them using the speech decoder 122 and a unified endpointer 124 configured to perform endpointing roles for both long-form speech detection and query endpoint detection. The speech decoder 122, unified endpointer 124, and a language model 126 may collectively form an automatic speech recognition (ASR) system 129. The ASR system 129 may include other components as well. While the example shown depicts the ASR system 129 residing on the server 110, the ASR system 129 may reside on the computing device 106. In some configurations, one or more components 122, 124, 126 of the ASR system 129 reside on the server 110 while the other one or more components 122, 124, 126 reside on the computing device 106.

The speech decoder 122 may be configured to identify the different phenomes that are included in the portions of the audio data 108. The portions 116, 118, and 120 of the audio data 108 may not correspond to different phenomes of the utterance 104. For example, the portion 116 of the audio data 108 may include the "wh" sound and some of the "a" sound. The portion 118 of the audio data 108 may include the remaining portion of the "a" sound" and the "t" sound. The speech decoder 122 processes the portions 116 and 118 and identifies the phonemes for the "wh" sound, the "a" sound, and the "t" sound. The speech decoder 122 may process the portion 120 and identify a silence phoneme. In some implementations, a different processing engine of the server identifies the phonemes based on the portions 116, 118, and 120 of the audio data 108 and provides the phonemes and timing data to the speech decoder 122. The timing data may include the amount of time that the user 102 used to speak each phoneme. In some implementations, the computing device 106 identifies the phonemes and each of the portions 116, 118, and 120 correspond to a different phoneme. In this instance, each of the portions 116, 118, and 120 may include timing data that specifies the amount of time that the user 102 used to speak each phoneme.

The speech decoder 122 processes the phonemes of the audio data 108 and generates a transcription 128 of the audio data 108. In some implementations, the speech decoder 122 uses a language model 126 to generate the transcription 128. The speech decoder 122 may also use the language model 126 to determine when the user 102 has stopped speaking. For example, by applying the language model 126 to the initial phonemes of the audio data 108, the speech decoder 122 may determine that the user has likely not finished speaking after "what is" because "what is" is likely an incomplete utterance. The speech decoder 122 processes portions 116, 118, and 120 of the audio data 108 as the speech decoder 122 receives the portions 116, 118, and 120. The speech decoder 122 may determine that the user 102 likely spoke "what is" while receiving portions of the audio data 108 that correspond to "California".

The unified endpointer 124 also receives the portions 116, 118, and 120 of the audio data 108 and applies them to a trained endpointer model 200. The unified endpointer 124 processes the portions 116, 118, and 120 of the audio data 108 as the server 110 receives the portions and generates a confidence score that reflects a likelihood that the user 102 has finished speaking (i.e. final silence). Using the trained endpointer model 200, the unified endpointer 124 may also consider other acoustic cues to help differentiate silence at different locations in the utterance (e.g., pre-query silence and mid-query pauses) to help predict when the user 102 likely finished speaking. Accordingly, the trained endpointer model 200 enables the unified endpointer 124 to predict one of four targets/classes of speech, initial silence, intermediate silence, and final silence such that predicting the final silence target (e.g., when a confidence score of final silence satisfies a threshold) results in the endpointer 124 making a hard microphone closing decision. In other words, the confidence score reflects a probability that the utterance 104 is complete. The end of query detector 124 compares the confidence score to a threshold score. If the confidence score satisfies a threshold, then the end of query detector 124 determines that the user 102 has likely finished speaking and the utterance is likely complete.

In the example shown, the unified endpointer 124 may process the portions 116, 118, 120 of the audio data 108 that correspond to the user 102 speaking "what" followed by the silence between "what" and "is" to predict the initial silence target before portion 116, the speech target while the user is speaking "what", and the intermediate silence between "what" and "is". In this scenarios, after processing portions 116, 118, 120 of the audio data 108, the unified endpointer 124 has not predicted the final silence target and therefore determines that the user 102 has not likely finished speaking.

At stage E and at time equals fifteen hundred seconds, the user 102 finishes speaking the utterance 104 ("What is the weather in California") without informing the computing device 106 that the utterance 104 is complete. Since the ASR system 129 does not have any information from the user 102 indicating that the user 102 has finished speaking, the microphone of the computing device 106 remains open and may receive and process additional sounds. Accordingly, following the last portion of the audio data 108 that includes the user's speech, the computing device 106 transmits portions of the audio data 108 that indicate silence, similar to the portion 120. As the server 110 continues to receive portions of the audio data 108, the speech decoder 122 and the unified endpointer 124 continue to process the portions of the audio data 108, whereby the speech decoder 122 analyzes the phonemes and uses the language model 126 to generate the transcription 128 and the unified endpointer 124 applies the trained endpointer model 200 to the portions of the audio data 108 to predict the final silence target for detecting when the user has likely finished speaking.

At stage F and at time equals sixteen hundred seconds, the speech decoder 122 generates the transcription 128 and may send the transcription 128 to the computing device 106 for output on a graphical user interface executing on the computing device 106. In some examples, the speech decoder 122 streams the transcription 128 in real-time such that the computing device 106 continuously outputs individual characters of the transcription 128 in a streaming fashion. As mentioned above, the computing device 106 may implement the ASR system 129 on device such that the transcription 128 is generated on the computing device 106 for output thereon. As used herein, outputting the transcription 128 may include displaying the transcription 128 as text in the graphical user interface and/or audibly outputting synthesized speech representing the transcription 128. Accordingly, the server 110 and/or the computing device 106 may include a text-to-speech (TTS) system for converting the transcription 128 into corresponding synthesized speech. If the user 102 begins speaking again, then the process of analyzing the portions of the audio data by the speech decoder 122 continues. In some implementations, the server 110 and/or the computing device 106 may perform an action based on the transcription 128 such as initiate a phone call, send a message, open an application, initiate a search query, or any other similar action.

At stage G occurring substantially simultaneously with Stage F, the unified endpointer 124 determines, using the trained endpointer model 200, that the user 102 has likely finished speaking by predicting the final silence target. Accordingly, the unified endpointer 124 may generate an output for the computing device 106 to endpoint the utterance 104 at a particular time. The endpointer 128 may be configured to determine the particular time by adding a short length of time (e.g., 300 milliseconds) from the time of determining that the user has likely finished speaking in case the user 102 actually has not finished speaking. For example, when the endpointer 124 predicts the user 102 has likely finished speaking at time fifteen hundred milliseconds, the endpointer 124 may generate the output for the computing device 106 to endpoint the utterance at the particular time of eighteen hundred milliseconds such that hard microphone closing event occurs 106.

At stage H, in response to the unified endpointer 125 predicting the final silence target, the server 110 transmits an instruction 112 to the computing device 106 to cause the computing device 106 to deactivate the microphone at the particular time of eighteen hundred milliseconds.

In additional detail and in some streaming speech recognition applications such as voice search, it is helpful to determine quickly and accurately when the user has finished speaking their query. As aforementioned, a speech recognition application simply declaring an end-of-query whenever a fixed interval of silence is detected by a VAD classifier trained to classify each frame as speech or silence is not optimal because simply detecting silence ignores potential acoustic cues such as filler sounds and past speaking rate which may indicate whether a given pause is temporary or query-final. Implementations herein are directed toward the unified endpointer 124 using a multidomain endpointer model 200 configured to make the silence detection VAD training criterion closely related to the EOQ detection training criterion by leveraging a multitask learning (MTL) approach for jointly completing tasks across both the query endpoint detection domain and the long-form speech detection domain. The terms 'EOQ detection' and 'query endpoint detection' are used interchangeably herein. As will become apparent, the multidomain endpointer model 200 may use various acoustic speech characteristics that include pitch, loudness, intonation, sharpness, articulation, roughness, instability, and speech rate to determine whether the user has likely finished speaking. The multidomain endpointer model 200 may also take into account other acoustic cues which may occur during pauses in use speech to determine whether the user has likely finished speaking.

Figure 2:
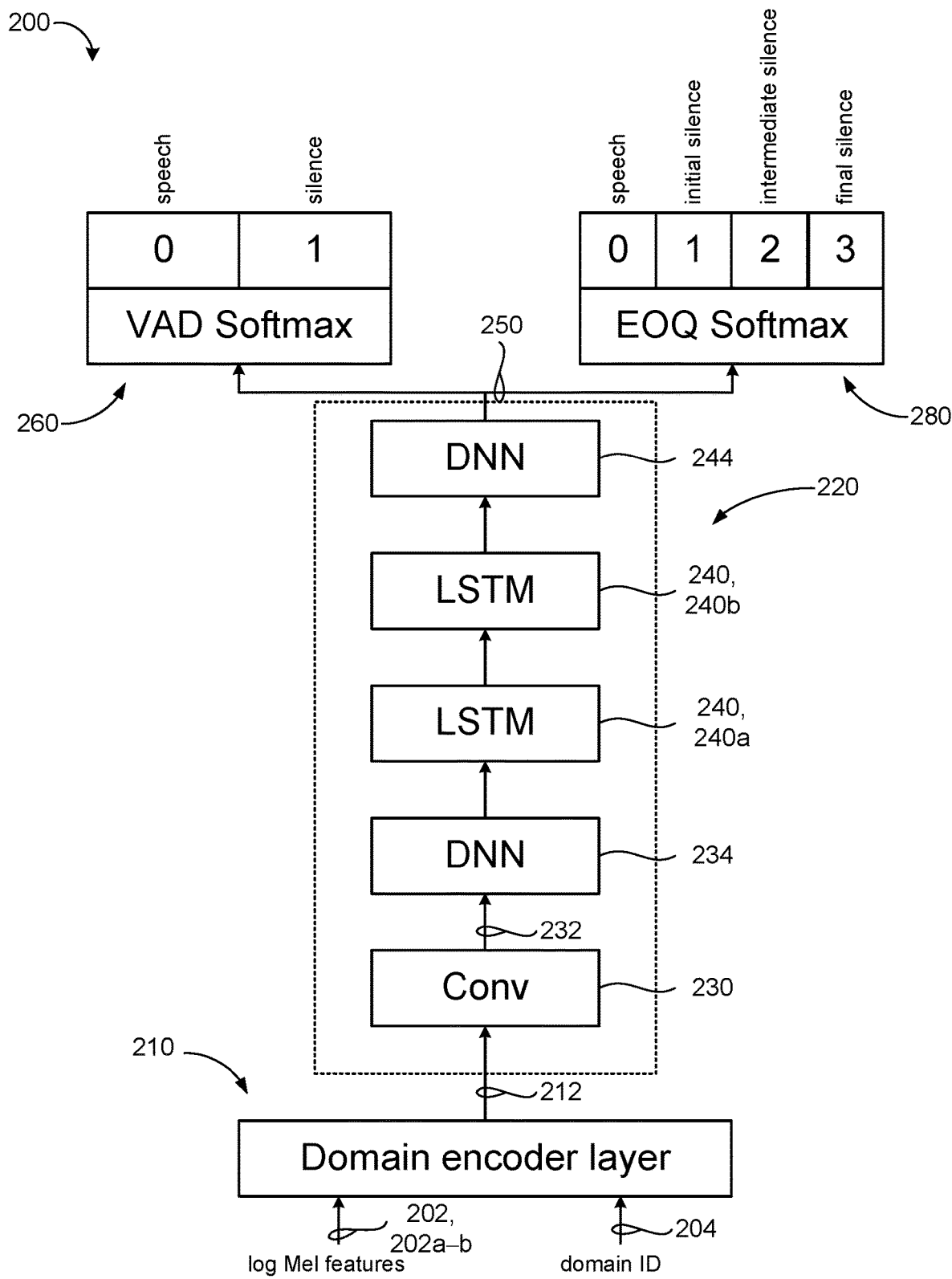
FIG. 2 is a schematic view of an example multidomain endpointer model.

FIG. 2 shows an example architecture of a multidomain endpointer model 200 for leveraging MTL for jointly completing tasks across both the query endpoint detection domain and the long-form speech detection domain. Advantageously, the multidomain endpointer model 200 shares hidden layers of a neural network 220 between the two tasks/domains and uses separate output layers 260, 280 for VAD and EOQ detection, respectively, to maintain the differences between domain-specific endpoint targets. Notably, the output layer 260 for VAD provides a VAD classifier for making a binary speech versus non-speech decision for each audio frame (e.g., every 10 milliseconds) suitable for long-form utterances (e.g., lasting greater than 10 seconds), while the output layer 280 for EOQ detection provides an EOQ classifier for predicting one of four targets of speech, initial silence, intermediate silence, and final silence for each audio frame (e.g., very 10 milliseconds) suitable for short-form utterances (e.g., last a few seconds) associated voice queries/actions. Prediction of the final silence target is indicative of a microphone closing event.

In the example shown, the multidomain endpointer model 200 (or simply 'model 200') includes a unified Convolutional, Long Short-Term Memory, Deep Neural Network CLDNN 220 shared across each of the long-form speech detection domain and the EOQ detection domain. The CLDNN 220 provides a unidirectional architecture having a convolutional input layer 230 followed by a first feedforward deep neural network (DNN) layer 234, one or more long short-term memory (LSTM) layers 240, 240a-b, and a second DNN layer 244.

To achieve MTL learning across each of the domains, the CLDNN 220 is configured receive training data 201 covering a plurality of utterances across multiple domains including a first training set of short-form speech utterances 202a and a second training set of long-form speech utterances 202b and learn domain-independent information while capturing the differences across both of the domains. The training data 201 may include acoustic features 202 representing the short-form speech utterances 202a and the long-form utterances 202b, as well as corresponding transcriptions for the utterances. That is, each short-form speech utterance 202a may include a corresponding sequence of short-form acoustic features representing the short-form speech utterance 202a and each long-form speech utterance 202b may include a corresponding sequence of long-form acoustic features representing the long-form speech utterance 202b. Here, the corresponding transcription for each long-form speech utterance 202b includes a corresponding long-form speech sequence of reference VAD labels each including one of a reference VAD speech label (e.g., "0" denotes speech) or a reference VAD silence label (e.g., "1" denotes silence). On the other hand, the corresponding transcription for each short-form speech utterance 202a includes a sequence of reference EOQ labels each including one of a reference EOQ speech label, a reference EOQ initial silence label, a reference EOQ intermediate silence label, or a reference EOQ final silence label. In some examples, the acoustic features 202 of the training data 201 includes features vectors of 40-dimensional log-mel filterbank energies using 25 millisecond windows every 10 milliseconds.

In order to facilitate the learning of the domain independent information, the CLDNN 220 receives a domain index (id) 204 as an additional feature input associated with each acoustic feature 202 to indicate a corresponding domain of the associated acoustic feature 202. For instance, each domain id 204 represents domain information indicating whether the associated acoustic feature 202 corresponds to the long-form speech domain or the short-form speech domain (e.g., voice query/action domain). Specifically, a domain id 204 is appended/concatenated to the end of each acoustic feature 202 (e.g., each acoustic feature vector of 40-dimensional log-mel filterbank energies) without explicitly converting the domain id 204 into an embedding vector.

However, directly feeding the concatenation of the acoustic feature 202 and the associated domain id 204 to the convolutional input layer 230 is not preferable since the acoustic feature 202 is in the real frequency space and the domain id 204 includes a categorical integer. Accordingly, the endpointer model 200 additionally includes an initial feedforward layer 210 that functions as a feedforward layer to convert the combined inputs 202, 204 into a domain-aware hidden representation 212. In some examples, the initial feedforward layer 210 includes a domain encoder layer 210 configured to transform both the original acoustic feature 202 (e.g., short-form acoustic feature 202a or long-form acoustic feature 202b) and the associated domain id 204 into a hidden feature space that is suitable for convolutions at the convolutional input layer 230. In these examples, rather than concatenating a hidden acoustic feature vector and a domain embedding learned by the domain encoder layer 210, the two hidden representations are added together to form the domain-aware hidden representation 210 of the original inputs 202, 204 that is fed into the convolutional input layer 230 of the CLDNN 220. The domain encoder layer 210 thus permits the convolution in the CLDNN 220 to operate in a latent space instead of the original frequency space. In some examples, the domain encoder layer 210 is a fully connected layer with 40 hidden units to transform the input acoustic feature vector 202 to encode the domain specific information indicated by the domain id 204.

The CLDNN 220 is trained to be aware of both VAD classification for endpointing in the long-form speech detection domain and EOQ classification for endpointing in the EOQ detection domain through the multitask learning. Here, the CLDNN 220 adds both VAD loss ($L_{VAD}$) and EOQ loss ($L_{EOQ}$) during training to learn the shared hidden representations suitable for each of the two classification tasks, e.g., VAD classification and EOQ classification. A combined loss (L(n)) of the multitask learning training may be represented by the following equation.

$$\mathcal{L}_{(n)} = \mathcal{L}_{VAD}(n) + w * \mathcal{L}_{EOQ}(n) * m(d) \quad (1)$$

where w represents a hyper parameter that balances the contribution of the two losses during training and m(d) represents a mask equal to zero to filter out EOQ loss and only consider VAD loss ($L_{VAD}$) when the long-form speech detection domain is indicated by the domain id 204. The mask m(d) is equal to one when the EOQ detection domain is indicated by the domain id 204.

The convolutional input layer 230 may include 64 convolutional filters having a filter size equal to eight (8) feature dimensions by one (1) frame (10 milliseconds) in time and a stride equal to one (1). The CLDNN may use non-overlapping max pooling along with a pooling size equal to three (3). In the example shown, the CLDNN 220 includes two time-LSTM layers 240a, 240b each with 64-cells and the second DNN layer 244 corresponds to a fully connected layer with 64 hidden units. All LSTM parameters may be uniformly initialized with values between −0.02 and 0.02 and the weights for the first and second DNN layers 234, 244 may be initialized using a Glorot-Bengio strategy. The multidomain endpointer model 200 may be trained with cross-entropy criterion that uses asynchronous stochastic gradient descent (ASGD). Here, when using a constant learning rate of 2e-5 for around 100 mission training steps, each step computes the gradient on one full utterance.

The first DNN layer 234 corresponds to a low-rank layer that receives as input, a convolution output 232 of the convolutional input layer 230 during each of a plurality of time steps. The LSTM layers 240 allow predictions to be informed by past acoustic events and provide the potential to automate learning of acoustic cues such as filler sounds and past speaking rate which may be temporally isolated from frames where they are most useful for EOQ detection. As such, the model 200 may extract better EOQ-related information from existing acoustic features by using sequential LSTM layers 240.

The VAD classifier output layer 260 may include a first softmax output layer configured to receive, as input during each of a plurality of time steps/frames, an output 250 of the second DNN layer 244 of the CLDNN 220. On the other hand, the EOQ output classifier output layer 280 may include a second softmax output layer configured to receive, as input during each of the plurality of time steps, the output 250 of the second DNN layer 244 of the CLDNN 220. However, since the corresponding transcriptions associated with the long-form speech utterances 202b are unable to define reference labels for the intermediate silence and final silence classes/targets, the EOQ output classifier output layer 280 is only trained on the training data 201 that includes the first training set of short-form speech utterances 202a while excluding the second training set of long-form speech utterances 202b. For instance, Equation (1) may set the value of the mask m(n) equal to zero when the domain id 204 indicates the long-form speech domain to effectively filter out any EOQ loss associated with long-form speech utterances 202b used during training. The VAD output classifier output layer 260 is trained on all the training data 201 including both the first training set of short-form speech utterances 202a and the second training set of long-form speech utterances 202b. Here, for each short-form speech utterance 202a, the VAD classifier output layer 260 may generate a sequence of short-form speech sequence of predicted VAD labels each inducing one of a predicted VAD speech label (e.g., "0") or a predicted VAD silence label (e.g., "1").

The endpointer 124 may determine a short-form speech VAD loss associated with each corresponding short-form speech utterance by comparing the short-form speech sequence of predicted VAD labels output from the VAD classifier output layer 260 to a corresponding short-form speech sequence of reference VAD labels for the corresponding short-form speech utterance using force alignment. Here, the sequence of reference VAD labels correlated to a sequence of reference EOQ labels provided by the corresponding transcription of the training data where the reference EOQ labels indicating initial silence, intermediate silence, and final silence are summed to obtain the reference VAD silence label.

In parallel with determining the short-form speech VAD loss, the endpointer 124 may determine a short-form speech EOQ loss associated with each corresponding short-form speech utterance by comparing the short-form speech sequence of predicted EOQ labels output from the EOQ classifier output layer 280 to a corresponding short-form speech sequence of reference EOQ labels for the corresponding short-form speech utterance using forced alignment. The reference EOP label of final silence (e.g., "3") for each short-form speech utterance 202 can be obtained by measuring median latency defined as an amount of time it takes for a microphone to close after a user finishes speaking the corresponding short-form speech utterance 202a. The forced alignment may include identifying a time stamp of a last phoneme as a "true" end of query occurring just before final silence. An optimal median latency for microphone closing may be selected based on fixed word error rates (FER). Accordingly, using cross-entropy criterion, the multidomain endpointer model 200 may be trained based on a combination of the short-form speech VAD loss and the EOQ loss determined for each short-form speech utterance 202a using Equation (1). The hyper parameter w may adjust the contribution of the EOQ loss for training the multidomain endpointer model 200.

For each long-form speech utterance 202b in the second training set of long-form speech utterances 202b, the endpointer 124 uses the VAD classifier output layer 260 to generate a long-form sequence of predicted VAD labels each including one of the predicted VAD speech label (e.g., "0") or the predicted VAD silence label (e.g., "1"). The endpointer 124 may then determine a long-form speech VAD loss associated with each long-form speech utterance 202b by comparing the corresponding long-form speech sequence of predicted VAD labels output from the VAD classifier output later 260 to a corresponding long-form speech sequence of reference VAD labels for the long-form speech utterance 202b using forced alignment. Accordingly, using cross-entropy criterion, the multidomain endpointer model 200 may be trained based only the long-form speech VAD loss determined for each long-form speech utterance 202b using Equation (1), whereby the mask m(d) is equal to zero to filter out any contribution of EOQ loss and only consider VAD loss ($L_{VAD}$) during training when the long-form speech detection domain is indicated by the domain id 204.

In some implementations, the first output layer 260 provides a probabilistic VAD output layer for the VAD classification and the second output layer provides a probabilistic EOQ output layer for the EOQ classification. In these implementations, the first softmax output layer 260 is configured to determine a sequence of framewise binary speech versus silence predictions and the second softmax output layer 280 is configured to predict one of the four targets/classes of speech, initial silence, intermediate silence, and final silence. The endpointer model 200 uses the predicted final silence for making microphone closing decisions. In some examples, framewise posteriors of the final silence prediction are thresholded to obtain a hard microphone closing decision. While the first softmax output layer 260 may also be trained to determine only binary incomplete versus complete utterance predictions for making microphone closing decisions, the use of four target/classes facilitates the capture of any acoustic cures to help differentiate silence at the different locations in the utterance.

Figure 3:
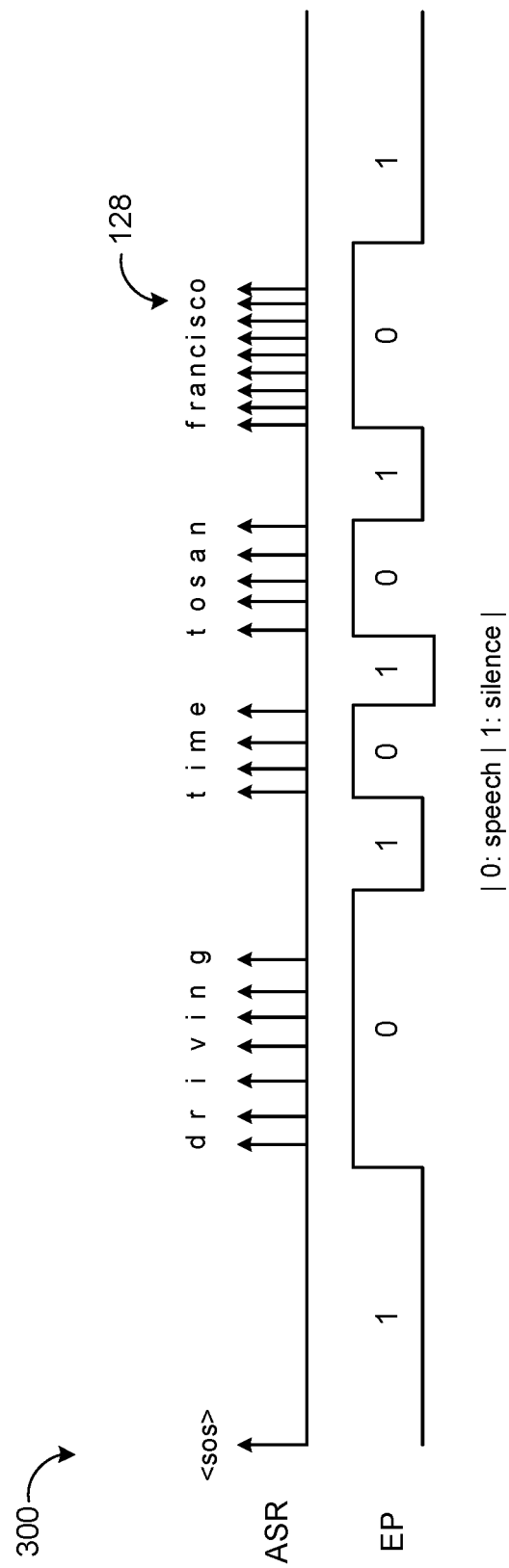
FIG. 3 is a plot of a sequence of predicted voice activity detection labels for an utterance.

FIG. 3 shows an example plot 300 depicting VAD classification of binary speech versus silence predictions output by the first softmax output layer 260 for an utterance represented by a sequence of acoustic features 202. The plot 300 also shows a corresponding transcription 128 for the utterance represented by the sequence of acoustic features 202. Here, for each frame (e.g., 10 ms) representing a corresponding acoustic feature 202, the first softmax output layer 260 outputs a binary value of "1" denoting a silence/non-speech prediction or "0" denoting a speech prediction. Here, the VAD classification is suitable for long-form speech detection (e.g., dictation or transcription of a meeting) by delineating portions of speech and silence, but is unable to predict the precise location of when the utterance ends.

Figure 4:
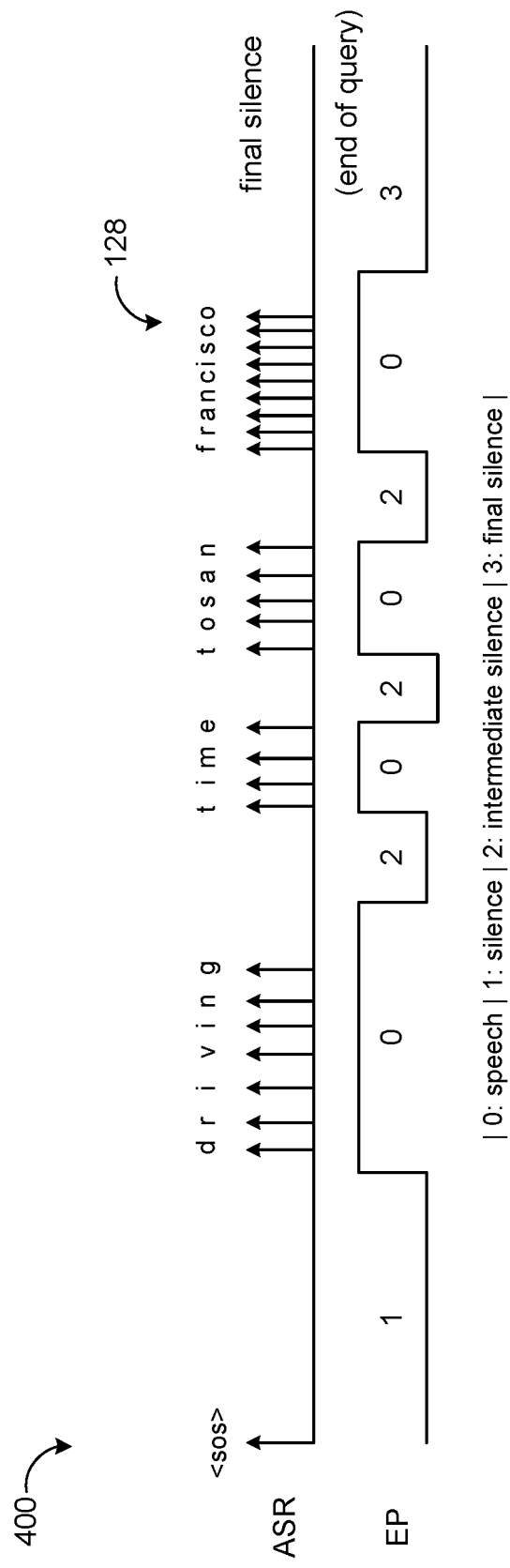
FIG. 4 is a plot of a sequence of predicted end-of-query labels for an utterance.

FIG. 4 shows an example plot 400 depicting EOQ classification of predicting one of the four targets/classes of speech, initial silence, intermediate silence, and final silence output by the second softmax output layer 280 for the same utterance represented by the sequence of acoustic features 202 of FIG. 3. The plot 400 shows the corresponding transcription 128 for the utterance represented by the sequence of acoustic features 202. By contrast to the VAD classification shown in the plot 300 of FIG. 3, plot 400 shows the second softmax output layer 280 outputting, for each frame (e.g., 10 ms) representing the corresponding acoustic feature 202, one of a "0" denoting a speech prediction, a "1" denoting an initial silence prediction, a "2" denoting an intermediate silence prediction, or a "3" denoting a final silence prediction. Here, the second softmax output layer 280 for EOQ classification learns to predict the final silence output equal to "3" at the end of the query related to "driving time to San Francisco". The second softmax output layer 280 may threshold the frame-wise posterior of the final silence output to obtain a hard microphone closing decision at the computing device 106.

Figure 5:
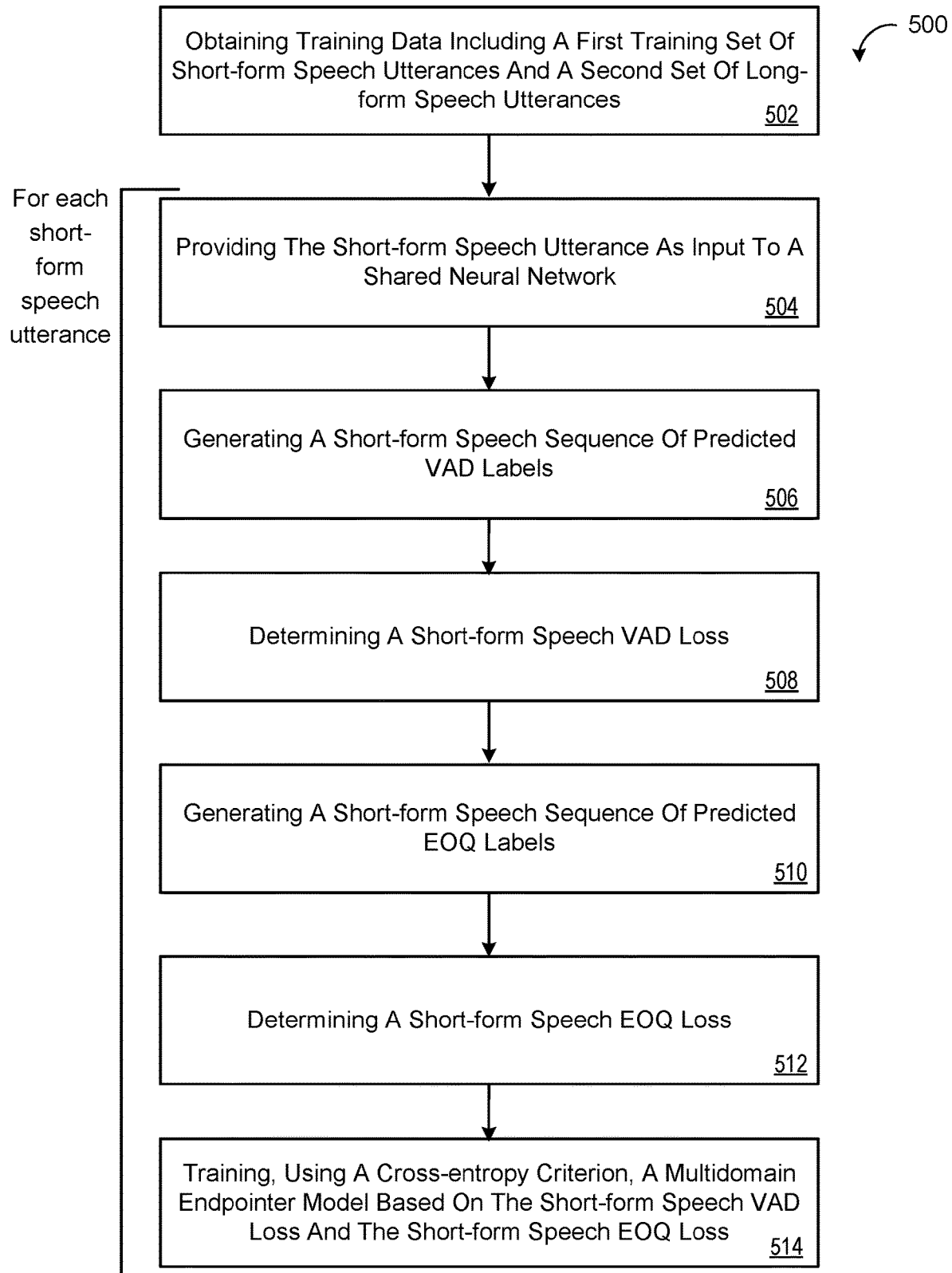
FIG. 5 is a flowchart of an example arrangement of operations for a method of training a multidomain endpointer model.

FIG. 5 provides a flowchart of an example arrangement of operations for a method 500 of training a multidomain endpointer model 200. At operation 502, the method includes obtaining training data 201 that includes a first training set of short-form speech utterances 202a and a second training set of long-form speech utterances 202b. The short-form speech utterances 202a correspond to voice queries or foice actions and include a sequence of reference EOQ labels each indicating one of a reference speech label, a reference initial silence label, a reference intermediate silence label, or a reference final silence label. The long-form speech utterances 202a include durations lasting at least ten seconds long. The long-form speech utterances 202b each include a corresponding transcription providing a sequence of reference VAD labels each indicating one of a reference VAD speech label or a reference VAD silence label.

For each short-form speech utterance 202a in the first training set of short-form speech utterances 202a, the method 500 performs operations 504-512. At operation 504, the method 500 includes providing the corresponding short-form speech utterance 202a as input to a shared neural network 220 of the multidomain neural network 200. The shared neural network 220 is configured to learn shared hidden representations suitable for both voice activity detection (VAD) and end-of-query (EOQ) detection.

At operation 506, the method 500 includes generating, using a VAD classifier output layer 260 of the multidomain endpointer model 200, a short-form speech sequence of predicted VAD labels each including one of a predicted VAD speech label or a predicted VAD silence label. At operation 508, the method 500 includes determining a short-form speech VAD loss associated with the corresponding short-form speech utterance 202a by comparing the short-form speech sequence of predicted VAD labels to a corresponding short-form speech sequence of reference VAD labels for the corresponding short-form speech utterance using force alignment.

At operation 510, the method 500 includes generating, using an EOQ classifier output layer 280 of the multidomain endpointer model 200, a sequence of predicted EOQ labels each including one of a predicted EOQ speech label, a predicted EOQ initial silence label, a predicted EOQ intermediate silence label, or a predicted EOQ final silence label. At operation 512, the method 500 includes determining an EOQ loss associated with the corresponding short-form speech utterance by comparing the short-form speech sequence of predicted EOQ labels to a corresponding short-form speech sequence of reference EOQ labels for the corresponding short-form speech utterance using forced alignment.

At operation 514, the method 500 includes training, using cross-entropy criterion, the multidomain endpointer model 200 based on the short-form speech VAD loss and the EOQ loss. For instance, training may include applying a weighted combined loss using Equation (1). Accordingly, the VAD classifier output layer 260 and the EOQ classifier output later 280 are each trained on the first training set of short-form speech utterances 202a and the second training set of long-form speech utterances 202b based on shared hidden representations learned by the shared neural network 220.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 6:
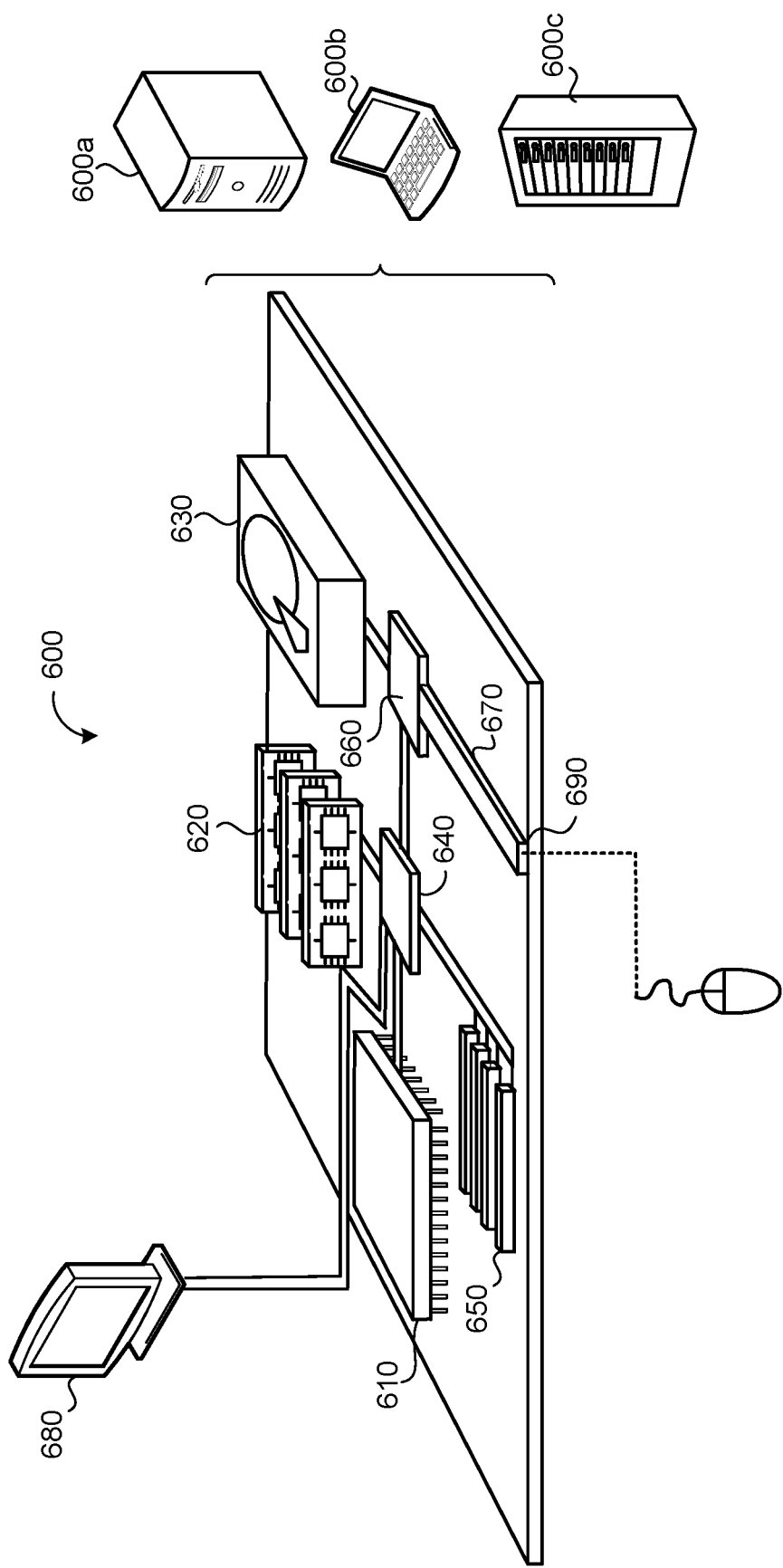
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware causes the data processing hardware to perform operations comprising:
   receiving, as input to a multidomain endpointer model, a sequence of audio features representing an utterance captured by a microphone of a user device, the multidomain endpointer model comprising a shared neural network trained on:
      a first training set of short-form speech utterances; and
      a second training set of long-form speech utterances;
   generating, as output from the multidomain endpointer model, a sequence of predicted end-of-query (EOQ) speech labels comprising a predicted EOQ speech label, a predicted EOQ initial silence label, a predicted EOQ intermediate silence label, and a predicted EOQ final silence label; and
   when the predicted EOQ final silence label is output from the multidomain endpointer model, obtaining a hard microphone closing decision that causes the user device to endpoint the utterance by deactivating the microphone.

2. The computer-implemented method of claim 1, wherein:
   each short-form speech utterance in the first training set of short-form speech utterances comprises a corresponding short-form speech sequence of reference EOQ labels comprising a reference EOQ speech label, a reference EOQ initial silence label, a reference EOQ intermediate silence label, and a reference EOQ final silence label; and
   each long-form speech utterance in the second training set of long-form speech utterances comprises a corresponding long-form speech sequence of reference voice activity detection (VAD) comprising a reference VAD speech label and a reference VAD silence label.

3. The computer-implemented method of claim 1, wherein the shared neural network of the multidomain endpointer model is trained to learn shared hidden representations suitable for both voice activity detection (VAD) and EOQ detection.

4. The computer-implemented method of claim 1, wherein the operations further comprise:
   generating, as output from the multidomain endpointer model, a sequence of predicted VAD speech labels comprising a predicted VAD speech label and a predicted VAD silence label,
   wherein obtaining the hard microphone closing decision is further based on when the predicted VAD silence label is output from multidomain endpointer model.

5. The computer-implemented method of claim 1, wherein the multidomain endpointer model comprises:
   a voice activity detection (VAD) classifier output layer configured to output a sequence of predicted VAD labels, the VAD classifier layer trained on:
      the first training set of short-form speech utterances; and
      the second set of long-form speech utterances; and
   an EOQ classifier output layer configured to output the sequence of predicted EOQ speech labels in parallel with the sequence of predicted VAD labels output by the VAD classifier output layer, the EOQ classifier output layer trained on the first training set of short-form speech utterances while excluding the second training set of long-form speech utterances.

6. The computer-implemented method of claim 5, wherein the multidomain endpointer model comprises a unified convolutional, long short-term memory, deep neural network (CLDNN) having a unidirectional architecture.

7. The computer-implemented method of claim 6, wherein the multidomain endpointer model comprising the CLDNN comprises:
   a convolutional input layer;
   a first feedforward deep neural network (DNN) layer configured to receive, as input during each of a plurality of time steps, an output of the convolutional input layer;
   one or more long short-term memory LSTM) layers; and
   a second feedforward DNN layer.

8. The computer-implemented method of claim 7, wherein:
   the VAD classifier output layer comprises a first softmax output layer configured to receive, as input during each of a plurality of time steps, an output of the second feedforward DNN layer of the CLDNN; and
   the EOQ classifier output layer comprises a second softmax output layer configured to receive, as input during each of the plurality of time steps, the output of the second feedforward DNN layer of the CLDNN.

9. The computer-implemented method of claim 1, wherein the first training set of short-form speech utterances each comprise a duration that is shorter than a duration of each of the long-form speech utterances of the second training set of long-form speech utterances.

10. The computer-implemented method of claim 1, wherein each short-form speech utterance in the first training set of short-form speech utterances is associated with one of a voice query or a voice command.

11. The computer-implemented method of claim 1, wherein each long-form speech utterance in the second training set of long-form speech utterances comprises a duration of at least ten seconds.

12. A system comprising:
   data processing hardware; and
   memory hardware in communication with the data processing hardware and storing instructions that when executed on the data processing hardware cause the data processing hardware to perform operations comprising:
      receiving, as input to a multidomain endpointer model, a sequence of audio features representing an utterance captured by a microphone of a user device, the multidomain endpointer model comprising a shared neural network trained on:
         a first training set of short-form speech utterances; and
         a second training set of long-form speech utterances;
      generating, as output from the multidomain endpointer model, a sequence of predicted end-of-query (EOQ) speech labels comprising a predicted EOQ speech label, a predicted EOQ initial silence label, a predicted EOQ intermediate silence label, and a predicted EOQ final silence label; and
      when the predicted EOQ final silence label is output from the multidomain endpointer model, obtaining a hard microphone closing decision that causes the user device to endpoint the utterance by deactivating the microphone.

13. The system of claim 12, wherein:
   each short-form speech utterance in the first training set of short-form speech utterances comprises a corresponding short-form speech sequence of reference EOQ labels comprising a reference EOQ speech label, a reference EOQ initial silence label, a reference EOQ intermediate silence label, and a reference EOQ final silence label; and
   each long-form speech utterance in the second training set of long-form speech utterances comprises a corresponding long-form speech sequence of reference voice activity detection (VAD) comprising a reference VAD speech label and a reference VAD silence label.

14. The system of claim 12, wherein the shared neural network of the multidomain endpointer model is trained to learn shared hidden representations suitable for both voice activity detection (VAD) and EOQ detection.

15. The system of claim 12, wherein the operations further comprise:
   generating, as output from the multidomain endpointer model, a sequence of predicted VAD speech labels comprising a predicted VAD speech label and a predicted VAD silence label,
   wherein obtaining the hard microphone closing decision is further based on when the predicted VAD silence label is output from multidomain endpointer model.

16. The system of claim 12, wherein the multidomain endpointer model comprises:
- a voice activity detection (VAD) classifier output layer configured to output a sequence of predicted VAD labels, the VAD classifier layer trained on:
  - the first training set of short-form speech utterances; and
  - the second set of long-form speech utterances; and
- an EOQ classifier output layer configured to output the sequence of predicted EOQ speech labels in parallel with the sequence of predicted VAD labels output by the VAD classifier output layer, the EOQ classifier output layer trained on the first training set of short-form speech utterances while excluding the second training set of long-form speech utterances.

17. The system of claim 16, wherein the multidomain endpointer model comprises a unified convolutional, long short-term memory, deep neural network (CLDNN) having a unidirectional architecture.

18. The system of claim 17, wherein the multidomain endpointer model comprising the CLDNN comprises:
- a convolutional input layer;
- a first feedforward deep neural network (DNN) layer configured to receive, as input during each of a plurality of time steps, an output of the convolutional input layer;
- one or more long short-term memory LSTM) layers; and
- a second feedforward DNN layer.

19. The system of claim 18, wherein:
- the VAD classifier output layer comprises a first softmax output layer configured to receive, as input during each of a plurality of time steps, an output of the second feedforward DNN layer of the CLDNN; and
- the EOQ classifier output layer comprises a second softmax output layer configured to receive, as input during each of the plurality of time steps, the output of the second feedforward DNN layer of the CLDNN.

20. The system of claim 12, wherein the first training set of short-form speech utterances each comprise a duration that is shorter than a duration of each of the long-form speech utterances of the second training set of long-form speech utterances.

21. The system of claim 12, wherein each short-form speech utterance in the first training set of short-form speech utterances is associated with one of a voice query or a voice command.

22. The system of claim 12, wherein each long-form speech utterance in the second training set of long-form speech utterances comprises a duration of at least ten seconds.

* * * * *